US011398730B2

(12) United States Patent
Ignatova et al.

(10) Patent No.: US 11,398,730 B2
(45) Date of Patent: Jul. 26, 2022

(54) METHOD FOR OPTIMIZING THE SUPPLY OF ENERGY FROM AN ELECTRICAL ENERGY SOURCE IN AN ELECTRICAL INSTALLATION AND DEVICE FOR IMPLEMENTING SUCH A METHOD

(71) Applicant: SCHNEIDER ELECTRIC INDUSTRIES SAS, Rueil-Malmaison (FR)

(72) Inventors: Vanya Ignatova, Saint Martin D'Heres (FR); Alexandre Laporte, Grenoble (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 359 days.

(21) Appl. No.: 16/707,055

(22) Filed: Dec. 9, 2019

(65) Prior Publication Data

US 2020/0203950 A1 Jun. 25, 2020

(30) Foreign Application Priority Data

Dec. 19, 2018 (FR) ...................................... 18 73415

(51) Int. Cl.
*H02J 3/16* (2006.01)
*H02S 40/32* (2014.01)
(Continued)

(52) U.S. Cl.
CPC ................. *H02J 3/16* (2013.01); *H02M 7/44* (2013.01); *H02S 40/32* (2014.12); *H02S 50/10* (2014.12)

(58) Field of Classification Search
CPC ...... H02J 3/16; H02J 3/381; H02J 3/48; H02J 3/50; H02J 3/46; H02J 3/00; H02J 3/18;
(Continued)

(56) References Cited

U.S. PATENT DOCUMENTS

2010/0067271 A1* 3/2010 Garces .................... H02J 3/381
363/95
2012/0217807 A1* 8/2012 Galler ..................... H02J 3/381
307/53
(Continued)

FOREIGN PATENT DOCUMENTS

CN 103412207 B 8/2015
CN 108736509 A * 11/2018 ................ H02J 3/46
(Continued)

OTHER PUBLICATIONS

Indian Office Action dated Jan. 29, 2021 in Indian Patent Application No. 201944052004, citing document AA therein, 5 pages.
(Continued)

*Primary Examiner* — Tung S Lau
(74) *Attorney, Agent, or Firm* — Oblon, McClelland, Maier & Neustadt, L.L.P.

(57) ABSTRACT

A method for optimizing the energy supply from a variable electrical energy source in an electrical facility, operating in a self-consumption mode, connected to an electrical energy distribution network. A control device is configured to control an electrical energy inverter in an electrical facility and to an electrical facility including a control device for controlling an electrical energy inverter.

10 Claims, 9 Drawing Sheets

(51) Int. Cl.
*H02S 50/10* (2014.01)
*H02M 7/44* (2006.01)

(58) Field of Classification Search
CPC .......... H02M 7/44; H02S 40/32; H02S 50/10; Y02E 10/50
See application file for complete search history.

(56) References Cited

U.S. PATENT DOCUMENTS

| | | | |
|---|---|---|---|
| 2015/0236510 A1* | 8/2015 | Recio | H02J 3/1892 307/72 |
| 2015/0027012 A1 | 9/2015 | Kanayama et al. | |
| 2016/0259314 A1 | 9/2016 | Dhople et al. | |
| 2017/0338651 A1* | 11/2017 | Fishman | H02J 3/32 |

FOREIGN PATENT DOCUMENTS

| | | |
|---|---|---|
| EP | 2 582 002 A2 | 4/2013 |
| FR | 2 823 381 A1 | 10/2002 |
| WO | WO 2007/060328 A1 | 5/2007 |

OTHER PUBLICATIONS

France Preliminary Search Report dated Oct. 18, 2019 in French Application No. 18 73415 filed Dec. 19, 2018 (with English Translation of Categories of Cited Documents & Written Opinon), citing documents AA and AO-AR, 9 pages.

\* cited by examiner

Prior art

FIG. 7

METHOD FOR OPTIMIZING THE SUPPLY OF ENERGY FROM AN ELECTRICAL ENERGY SOURCE IN AN ELECTRICAL INSTALLATION AND DEVICE FOR IMPLEMENTING SUCH A METHOD

TECHNICAL FIELD

The present invention relates to a method for optimizing the energy supply from a variable electrical energy source, e.g. a photovoltaic source, in an electrical facility connected to an electrical energy distribution network and operating in a self-consumption mode. The invention also relates to a device implementing such a method for controlling an electrical energy inverter installed in the electrical facility and connected to the variable energy source. The invention also relates to an electrical facility comprising such a device.

PRIOR ART

Figure 7:
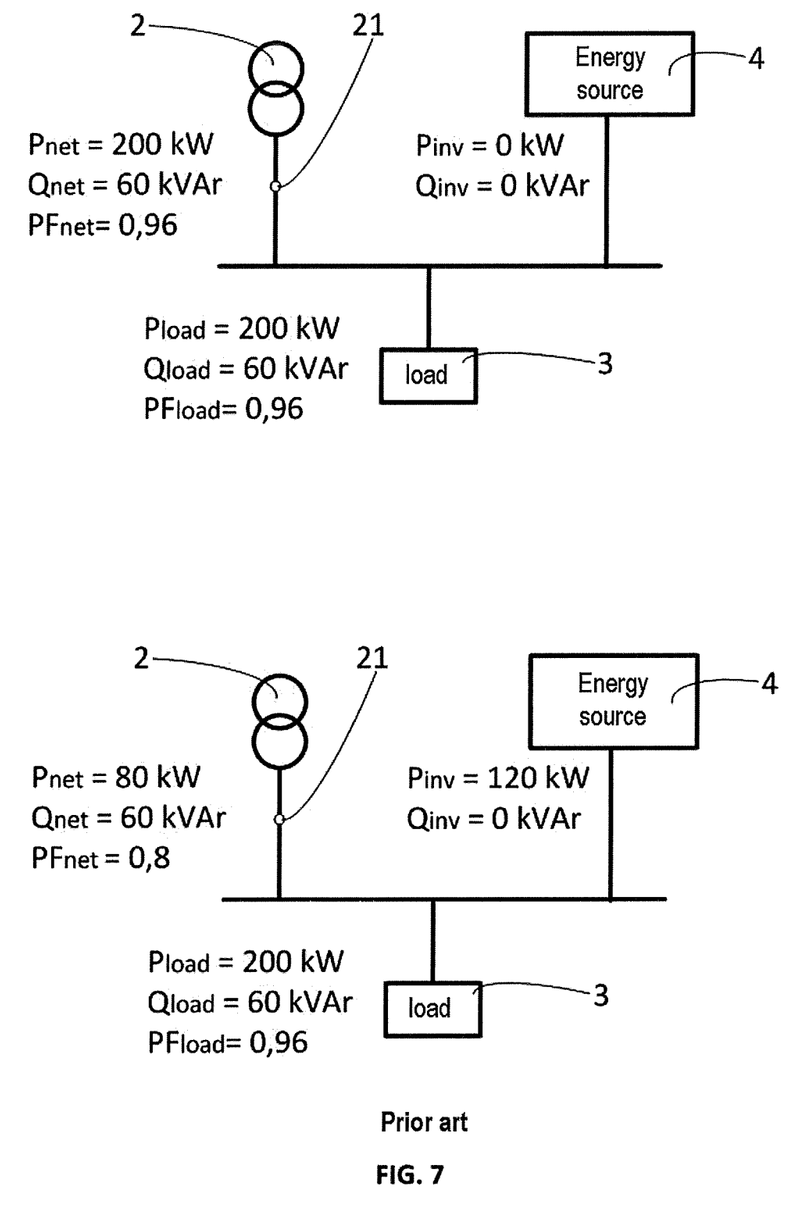
FIG. 7 represents a facility of the prior art.

The production of electrical energy from variable energy sources, e.g. energies generally referred to as renewable, such as solar or wind energy, is an alternative to energy production from fossil sources. It may form a source of revenue for a local energy producer and an energy boost for an electricity distributor. However, when it is connected to an electrical distribution network, the variable electrical energy source must not interfere with said electrical distribution network. In the prior art represented in FIG. 7, in the absence of energy production by the renewable source, for an electrical load consuming an active power of 200 kWatt and a reactive power of 60 kVar, or a power factor equal to 0.96, the electrical network supplies the same active, reactive powers with the same power factor. When the variable energy source supplies an active power of 120 kWatt and 0 kVar, the electrical network supplies the difference between the energy produced by the variable source and the energy consumed by the load or 80 kWatt of active power and 60 kVar of reactive power, the power factor becomes equal to 0.8. Accordingly, the power factor, seen by the electricity distribution network is degraded. Generally, penalties are applied by the energy distributor to a user whose electrical facility has a power factor less than a predetermined threshold, e.g. less than 0.93.

Patent Application US 2017/214 337 A1 describes the operation of an inverter connected between an AC energy source and an electrical energy distribution network, the inverter being controlled for supplying an active power and a reactive power according to a demand made by the operator of the energy distribution network. This operating mode does not allow the self-consumption of electrical energy produced by the alternative energy source and makes the management of the electrical facility dependent on the electrical energy distributor.

Patent application WO 2012/125 278 B2 describes a device for adjusting the active and reactive power produced by a photovoltaic facility according to the voltage supplied by the electrical distribution network, the amplitude of said voltage being taken as a reference, in order not to disrupt the operation of the electrical distribution network.

The U.S. Pat. No. 9,806,665 B2 on controlling the production of a photovoltaic facility is known. The photovoltaic facility regulates its production of active and reactive power to be within contractually imposed ranges. The regulation is performed by increasing or decreasing active power for adjusting the reactive power and vice versa by means of a proportional-integral controller.

Patent application EP 3 029 797 A1 describes a device for optimizing the conversion and production of energy from a renewable energy source. This device comprises a battery and can operate in self-consumption mode. The object of the invention is to maximize the local energy supply by optimizing the energy flows between the network, the battery, the load and the renewable source.

Patent application WO 2007/060 328 A1 describes a control device for a decentralized energy production facility performing voltage regulation at a connection point of the production facility by producing or absorbing active or reactive power.

DISCLOSURE OF THE INVENTION

The subject matter of the present invention is a method for optimizing the energy supply from a variable electrical energy source installed in an electrical facility connected to an electrical energy distribution network at a connection point, said electrical facility comprising:
  at least one inverter, connected firstly to the variable electrical energy source and secondly to the connection point, said inverter being arranged for converting the energy delivered by the electrical energy source and supplying a first controllable active power and a first controllable reactive power at the connection point, and
  an electrical load, connected to the connection point, and consuming a second active power and a second reactive power,
  the electrical energy distribution network supplying the electrical facility, with a third active power and a third reactive power with a network power factor,
  the method comprising a step of determining the first active power and the first reactive power that must be supplied by the inverter according to the second active power and the second reactive power, in order that the network power factor is greater than or equal to a predetermined target power factor.

Preferably, the first active power and the first reactive power are further determined for minimizing the third active power or maximizing the first active power.

According to a first particular embodiment, the inverter supplies the first active power and the first reactive power with an inverter power factor greater than or equal to a predefined minimum inverter power factor.

Preferably, the inverter supplies a maximum first reactive power when the inverter power factor is equal to the minimum inverter power factor.

According to a second particular embodiment, the electrical energy network supplies a minimum third active power to said electrical facility when the electrical facility is capable of supplying the electrical energy in a self-consumption mode.

Advantageously:
  the first active power supplied by the inverter is equal to the difference between the second active power consumed by the load and the minimum third active power supplied by the electrical energy distribution network,
  the inverter power factor is greater than or equal to the minimum power factor, and
  the third reactive power is minimized or the first reactive power is maximized.

According to a particular embodiment, the second active power and the second reactive power consumed by the load are evaluated in a sequence comprising:
  a step of controlling the inverter for supplying a zero first active power and a zero first reactive power, a step of measuring the third active power and the third reactive power, and a step of determining the second active power and the second reactive power, the second active power being equal to the third active power and the second reactive power being equal to the third reactive power.

The invention also relates to a control device for controlling an electrical energy inverter in an electrical facility connected to an electrical network at a connection point, said electrical facility comprising:

at least one electrical energy inverter connected firstly to the connection point, and connected secondly to at least one electrical energy source for converting the energy supplied by said energy source, said inverter supplying a first active power and a first reactive power with an inverter power factor, at least one electrical load, connected to the connection point, consuming a second active power and a second reactive power, the control device comprising:

a first measurement circuit for measuring either a third active power and a third reactive power or a third apparent power and a network power factor at the connection point, a second measurement circuit for measuring either the first active power and the first reactive power or the first apparent power and the inverter power factor, and a control circuit connected:

to the first measurement circuit for receiving a measurement of the third active power, the third reactive power, the third apparent power and the network power factor, to the second measurement circuit for receiving a measurement of the first active power, the first reactive power, the first apparent power and the inverter power factor supplied by the inverter, and to the electrical energy inverter for controlling the first active power and the first reactive power that must be supplied by said inverter, said control circuit being arranged for carrying out the method previously described and transmitting to the inverter an active power and reactive power supply instruction corresponding to the first active power and the first reactive power that must be supplied by said inverter.

The invention also relates to an electrical facility connected to an electrical network at a connection point, said electrical facility comprising:

at least one variable electrical energy source, at least one electrical energy inverter connected firstly to the connection point, and connected secondly to the variable electrical energy source for converting the energy supplied by said energy source into electrical energy available at the connection point, and at least one electrical load, connected to the connection point, and a control device for controlling the electrical energy inverter as previously described.

Preferably, the variable electrical energy source consists of at least one photovoltaic panel.

DETAILED DESCRIPTION OF PREFERRED EMBODIMENTS

Figure 1:
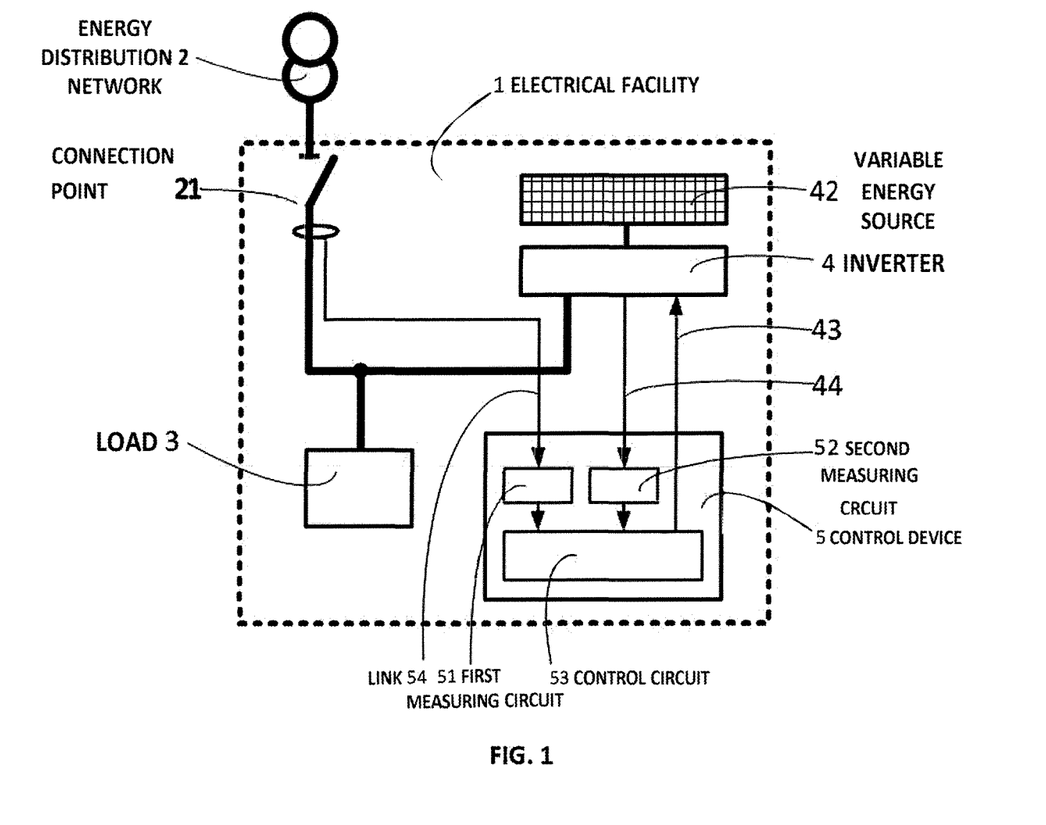
FIG. 1 represents in the form of a block diagram, an electrical facility comprising a variable energy source, an electrical load, an energy distribution network, an electrical energy inverter and a control device for controlling the inverter, for a device and a method according to embodiments of the invention.

FIG. 1 represents in the form of a block diagram, an electrical facility 1 comprising a variable energy source 42, an electrical load 3, an energy distribution network 2, at least one electrical energy inverter 4 and a control device 5 for controlling the inverter. The variable energy source 42 is a source of transforming sustainable energy such as the energy delivered by the sun into energy generally termed renewable such as solar, wind, tidal energy, etc. The variable energy source 42 is connected to the electrical energy inverter 4 the role of which is to transform the energy supplied by the variable source 42 into electrical energy that can be consumed by the electrical load 3. The electrical load 3 is connected to the inverter 4 in the electric facility 1. The electrical facility 1 is connected to an electrical energy distribution network 2 at a connection point 21, the electrical load 3 and the inverter 4 are therefore connected to the energy distribution network 2.

In the electrical facility 1, the electrical energy inverter 4 supplies a first active power Pinv and a first reactive power Qinv. The level of power supplied by the inverter 4 is controllable: the control device 5, connected to said inverter 4, sends to the inverter 4 an active CmdPinv and a reactive CmdQinv power supply instruction, in order for the inverter 4 to supply the first active power Pinv and the first reactive power Qinv required. The electrical load 3 consumes a second active power Pload and a second reactive power Qload. The electrical load 3 represents one or more electrical devices that can be placed in operation or out of operation as required. The second active power Pload and the second reactive power Qload therefore vary over time. The electrical facility 1 preferably operates in self-consumption mode, that is to say that the variable energy source 42 supplies energy to the electrical load 3. However, firstly, the variable energy source 42 is not always dimensioned for supplying all the energy consumed by the electrical load 3 and, secondly, the energy supply by the energy source 42 is made variable by the presence of clouds, the variation in wind strength, the season, etc. and, accordingly, in the case where the variable energy source 42 is not capable of supplying all the energy required by the electrical load 3, the energy distribution network 2 supplies, in addition, a third active power Pnet and a third reactive power Qnet.

Figure 2:
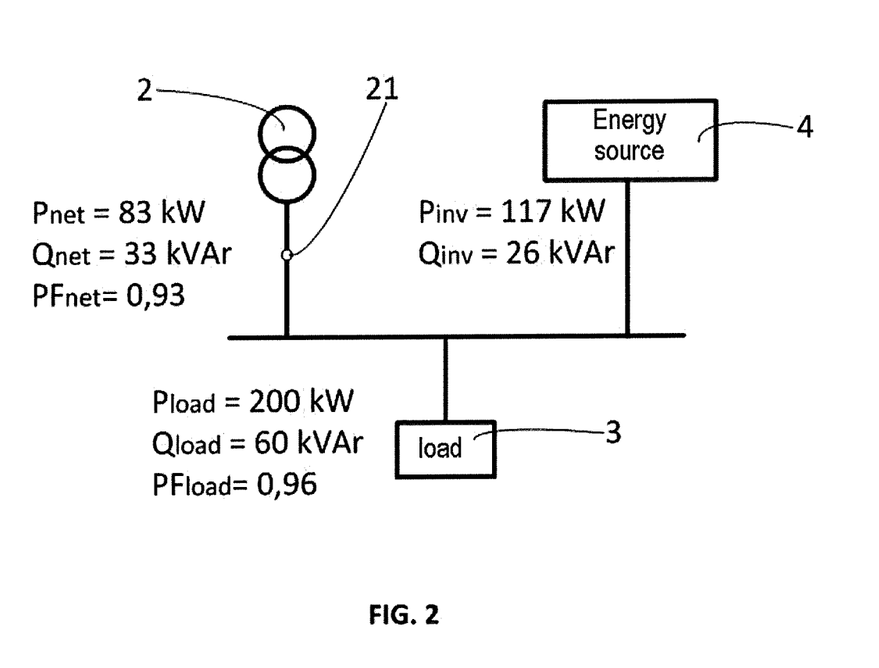
FIG. 2 is a schematic representation of an electrical facility comprising a variable energy source for illustrating, by an example, the values of the active and reactive powers and the power factor in the electrical facility allowing the self-consumption of the energy produced and maintaining a value of the power factor of the electrical facility above a power factor imposed by an energy distributor.
Figure 3:
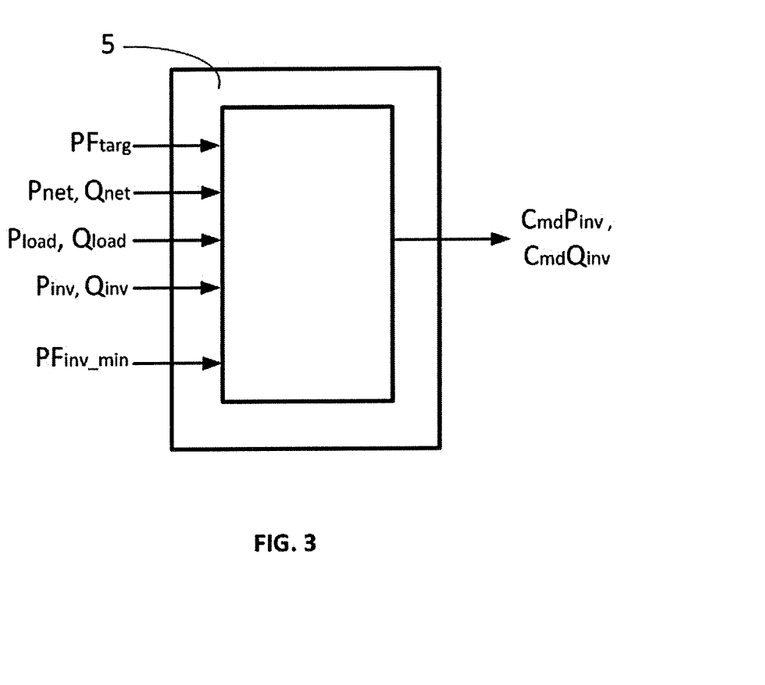
FIG. 3 represents in the form of a block diagram, the input and output data, according to an embodiment of the invention, for a method, implemented in a device, for optimizing the energy supply of a variable energy source.

The electrical facility 1 represents an electrical load for the distribution system 2 and the manager of the distribution network 2 imposes a network power factor PFnet greater than or equal to a target power factor PFtarg on the electrical facility 1. Penalties are applied when the network power factor PFnet of the electrical facility 1 is less than the target power factor PFtarg. FIG. 2 represents the electrical facility 1, in schematic form, for illustrating, by an example, the values of the active and reactive powers and the power factor allowing the self-consumption of the energy produced by the variable source 42. The power factor of the electrical facility PFnet is equal to the minimum power factor imposed by the energy distributor PFtarg. This balance is unstable since, on one hand, the second active power Pload and the second reactive power Qload vary according to the variations of the electrical load 3, and on the other hand, the first active power Pinv and the first reactive power Qinv vary according to the production of the energy source 42. The invention relates to a method for determining the first active power Pinv and the first reactive power Qinv that must be supplied by the inverter 4 according to the second active power Pload and the second reactive power Qload, in order for the network power factor PFnet to be greater than or equal to the predetermined target power factor PFtarg. The method is implemented in a control device 5 connected to the energy inverter 4 for controlling said inverter 4 to supply the first active and reactive powers Pinv and Qinv. The control device 5 also performs a measurement of the third active and reactive powers Pnet and Qnet supplied by the electrical network 2. FIG. 3 represents in the form of a block diagram, the input and output data used by the method forming the subject matter of the invention:

- the target power factor PFtarg is a predetermined parameter, defined by the manager of the distribution network 2, generally between 0.8 and 0.95,
- the third active and reactive powers Pnet and Qnet are preferably measured by means of a first measurement circuit 51 connected by a link 54 to the connection point 21,
- the value of each of the first active Pinv and reactive Qinv powers supplied by the inverter 4 may be measured at the output of said inverter 4 or transmitted by the inverter 4 to the control device 5 by a communication means 44,
- the second active and reactive powers Pload and Qload consumed by the load 3 may be data calculated from the values of the first and third powers according to steps described later, or optionally predefined if the electrical load 3 is fixed, and
- a predefined minimum power factor PFinv_m in for the operation of the inverter 4.

The method forming the subject matter of the invention proceeds cyclically: it processes the input data for supplying output data such as a controlled reactive power value Cmd_Pinv and a controlled reactive power value Cmd_Qinv to the inverter 4. The inverter 4 has the instruction for the supply of the active Pinv and reactive Qinv powers updated according to the values of the controlled active and reactive powers, Cmd_Pinv and Cmd_Qinv respectively.

FIGS. 4A to 4E illustrate, by means of Fresnel diagrams, the processing performed on the input data for obtaining the output data. In a Fresnel diagram, the active power is represented as the abscissa, the reactive power is represented as the ordinate. In order to clarify the diagrams, the active P and reactive Q powers are represented in the form of a representative vector of the apparent power, denoted by S. The apparent power is equal to the square root of the sum of the square of the active power and the square of the reactive power. The cosine of the angle that the representative vector of the apparent power makes with the abscissa axis corresponds to the power factor PF. The power factor is equal to the ratio of the active power P over the apparent power S, that is, PF=P/S. In the rest of the document, a first apparent power Sinv corresponds to an apparent power supplied by the inverter 4, a second apparent power Sload corresponds to an apparent power consumed by the load 3 and a third apparent power Snet corresponds to an apparent power supplied by the distribution network 2. Thus, in FIGS. 4A to 4E, the second active power, Pload is represented as the abscissa, the second reactive power Qload is represented as the ordinate, the second apparent power Sload is represented in the form of a vector having an origin at the intersection of the abscissa and ordinate axes and its end having for abscissa the value Pload, and for ordinate the value Qload. The third apparent power Snet is represented in the same way. In any case, the second apparent power Sload is equal to the vector sum of the third apparent power Snet supplied by the distribution network and the first apparent power Sinv supplied by the inverter:

[Equation 1]

$$\vec{Sload} = \vec{Snet} + \vec{Sinv}$$ [Math 1]

Sload being the representative vector of the second apparent power, Snet being the representative vector of the third apparent power, and Sinv being the representative vector of the first apparent power.

The following equations may also be formulated:

$$Pload = Pnet + Pinv$$

$$Qload = Qnet + Qinv$$

Pload being the second active power,
Pnet being the third active power,
Pinv being the first active power,
Qload being the second reactive power,
Qnet being the third reactive power,
Qinv being the first reactive power.

For translating equation 1 onto a Fresnel diagram, the first apparent power Sinv must have its origin at the end of the vector representing the third apparent power Snet supplied by the distribution network, and its end at the end of the vector representing the second apparent power Sload.

Figure 4A:
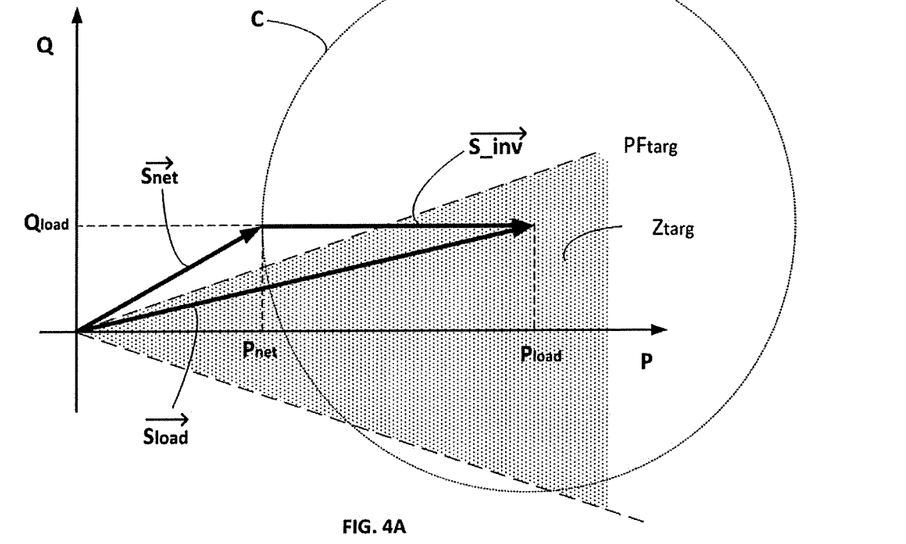
FIG. 4E FIGS. 4A to 4E illustrate, by means of Fresnel diagrams, representative vectors of the apparent, active and reactive powers and power factors at the electrical load, the energy inverter and the distribution network operating in a method according to an embodiment of the invention.

FIG. 4A represents a first Fresnel diagram in order to illustrate a drawback of the prior art. The second apparent power Sload lies within a target power factor area Ztarg corresponding to a power factor greater than the target power factor PFtarg. When the variable energy source 42 does not produce any energy, the first apparent power Sinv is zero and the distribution network 2 must supply the third apparent power Snet equal to the second apparent power Sload. In this case, the network power factor PFnet remains greater than the target power factor PFtarg. If the variable energy source 42 produces a purely reactive first apparent power Sinv, as represented in FIG. 4A, the third apparent power Snet decreases in amplitude but the network power factor PFnet leaves the area Ztarg, corresponding to a power factor less than the target power factor PFtarg. This configuration is unfavourable since, although the third apparent power Snet supplied by the distribution network is reduced, the production of energy by the variable energy source 42 will be penalized because of a bad network power factor PFnet.

Figure 4B:
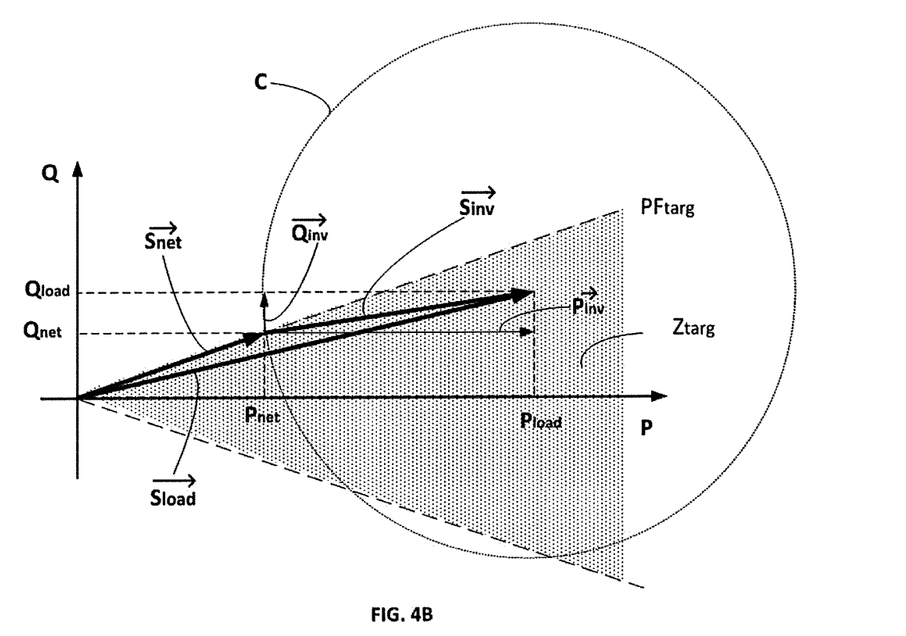

FIG. 4B represents a second Fresnel diagram in order to illustrate the method for determining the first active power Pinv and the first reactive power Qinv that must be supplied by the inverter according to the second active power Pload and the second reactive power Qload, in order for the network power factor PFnet to be greater than or equal to a predetermined target power factor PFtarg. Since the network power factor PFnet has to be greater than or equal to the target power factor PFtarg, the representative vector of the third apparent power Snet has to be located in the target power factor area Ztarg and, in the worst case, aligned in a direction corresponding to the target power factor PFtarg as represented in FIG. 4B. The end of the representative vector of the first apparent power Sinv is located at the end of the representative vector of the second apparent power Sload.

The inverter 4 supplies a first apparent power Sinv in relation to the energy supplied by the variable energy source 42. At a given instant, the first apparent power Sinv therefore cannot be increased, on the other hand the first active power Pinv and the first reactive power Qinv are controllable in order to supply the first apparent power Sinv with a controllable inverter power factor PFinv. The origin of the vector representing the first apparent power Sinv in FIG. 4B may thus turn on a circle C about the end of said vector Sinv.

To meet Equation 1, the representative vector of the first apparent power Sinv must have its origin at the intersection point between the circle C and, in the worst case, the direction corresponding to the target power factor PFtarg. There are an infinite number of possible solutions, however, the determination of the first apparent power Sinv represented in FIG. 4B is the solution that minimizes the third active power Pnet supplied by the distribution network 2 or maximizes the first active power Pinv supplied by the inverter 4. This solution is particularly useful since the network power factor PFnet is equal to the target power factor PFtarg and therefore no penalty is applied to the electrical facility 1. In addition, since the third active power Pnet supplied by the distribution network 2 is minimized, the cost of the energy supplied by the distribution network 2 will also be minimized.

Figure 4C:
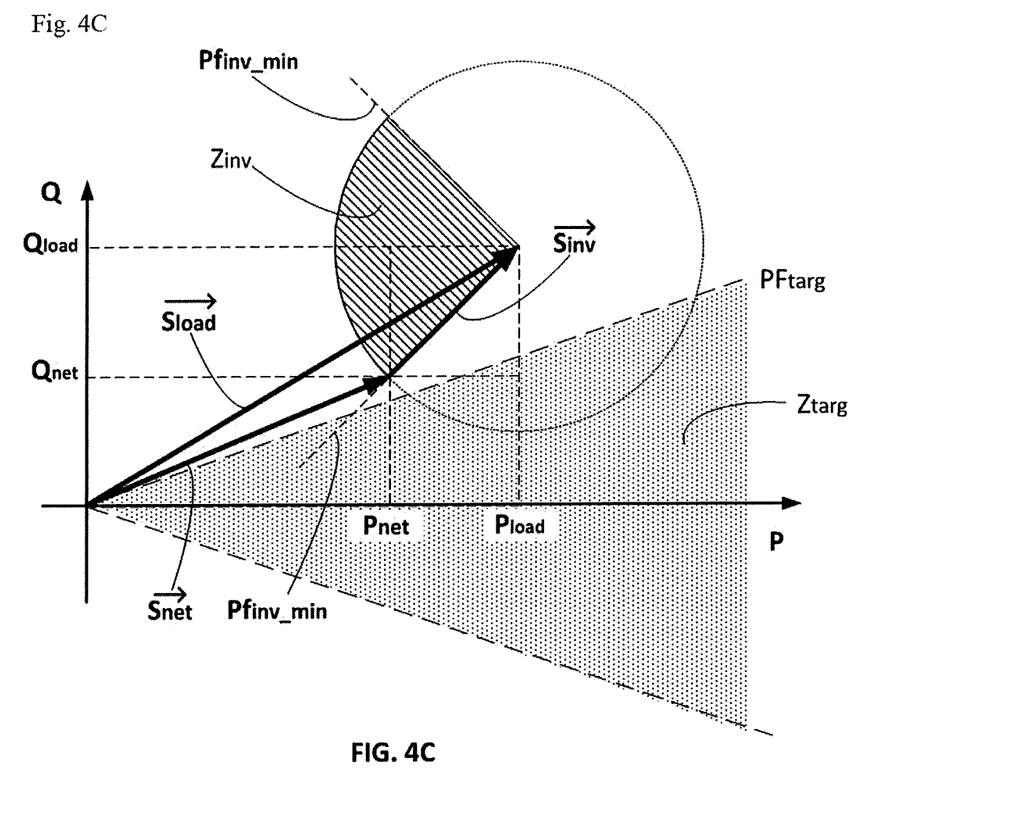

In order to reduce the cost of the means of energy conversion, an inverter 4 not comprising energy storage means, or comprising limited storage means, may be used. In this case, the first active power Pinv and the first reactive power Qinv are controllable, but the inverter power factor PFinv must be greater than or equal to a predefined minimum power factor PFinv_min. The power factor of the inverter PFinv is thus only controllable in an inverter power factor area Zinv greater than or equal to the minimum power factor PFinv_min, e.g. equal to 0.8. FIG. 4C represents a third Fresnel diagram in order to illustrate the method for determining the first active power Pinv and the first reactive power Qinv that must be supplied by the inverter 4 according to the second active power Pload and the second reactive power Qload, when the power factor PFinv of the inverter is limited to the inverter power factor area Zinv. The origin of the vector representing the first apparent power Sinv in FIG. 4C cannot turn on the circle C outside the inverter power factor area Zinv. The most favourable inverter power factor PFinv will therefore be the minimum power factor PFinv_min. In this configuration, the third active power Pnet supplied by the distribution network 2 will be minimized and the network power factor PFnet will be closer to the target power factor PFtarg, and the penalties related to a bad power factor will be minimized.

Figure 4D:
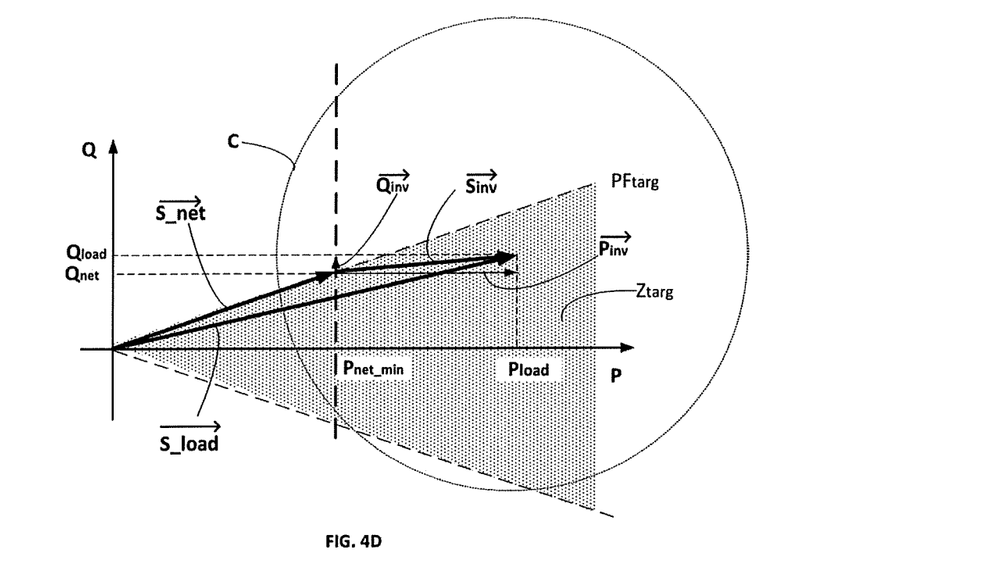

As part of an electrical facility 1 connected to an electrical energy distribution network 2 and operating in a self-consumption mode, the manager of said distribution network 2 may impose a supply of a predefined minimum third active power Pnet_min, e.g. on a contractual basis. In this case, the first active power Pinv supplied by the inverter 4 is less than or equal to the difference between the second active power Pload consumed by the load and the minimum third active power Pnet_min supplied by the electrical energy distribution network 2: Pinv≥Pload−Pnet_min. FIG. 4D represents a fourth Fresnel diagram in order to illustrate the method for determining the first active power Pinv and the first reactive power Qinv that must be supplied by the inverter 4 according to the second active power Pload and the second reactive power Qload, when the third active power Pnet is minimal, Pnet=Pnet_min. The representative vector of the third apparent power Snet is formed by the component of the third active power Pnet equal to the minimum power Pnet_min. Said vector is aligned in a direction corresponding to the target power factor PFtarg. The second apparent power Sload is the vector composite of the second active power Pload and the second reactive power Qload. The end of the representative vector of the first apparent power Sinv is located at the end of the representative vector of the second apparent power Sload. To meet Equation 1, the representative vector of the first apparent power Sinv must have its origin at the end of the representative vector of the third apparent power Snet supplied by the distribution network when said end is located within the circle C. It is possible to optimize the energy supply by the inverter 4 by increasing the first reactive power Qinv, in the limit where the power factor of the inverter PFinv remains in the inverter power factor area Zinv, which increases the network power factor PFnet. Otherwise, i.e. when the end of the representative vector of the third apparent power Snet is outside the circle C, there is no need for the constraint of supplying a minimum third active power Pnet_min since the inverter 4 is not capable of producing enough energy, the configuration is identical to the second Fresnel diagram described in FIG. 4B.

Figure 4E:
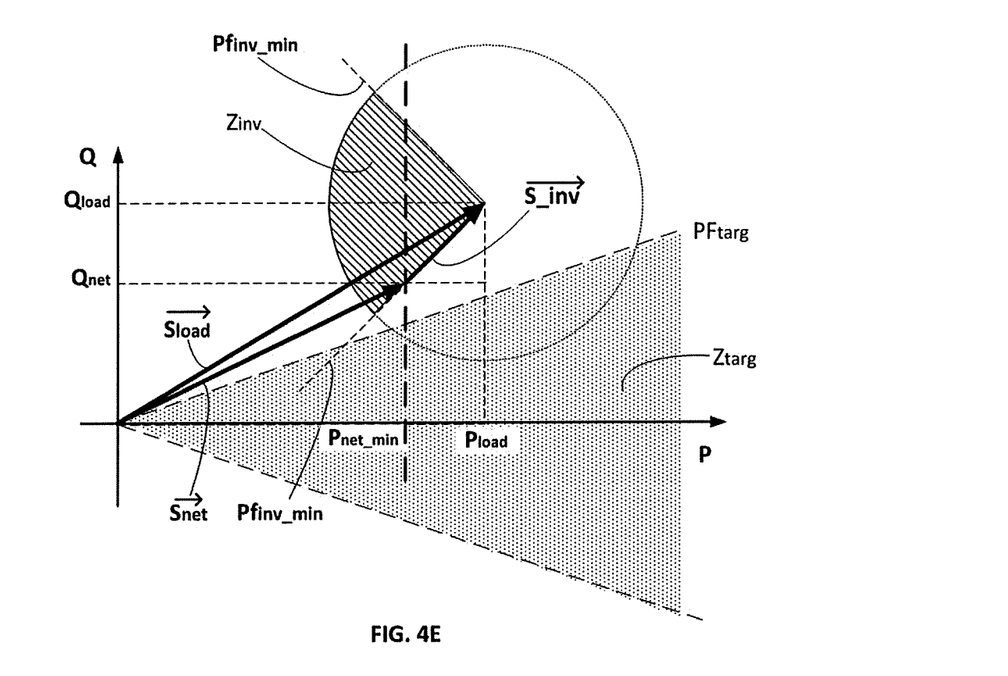

By means of a fifth Fresnel diagram, FIG. 4E represents a configuration combining the limitation of the inverter power factor PFinv with a value greater than or equal to the minimum power factor PFinv_min and the obligation of a consumption of minimum power Pnet_min. The origin of the representative vector of the first apparent power Sinv may not be simultaneously located in the inverter power factor area Zinv and in the target power factor area Ztarg. In this case:
- the first active power Pinv supplied by the inverter 4 is equal to the difference between the second active power Pload consumed by the load and the minimum third active power Pnet_min supplied by the electrical energy distribution network 2, Pinv=Pload−Pnet_min, and
- the inverter power factor PFinv is greater than or equal to the minimum power factor PFinv_min, and
- the third reactive power Qnet is minimized.

Other configurations are possible, though they may be reduced to one of the configurations described in one of FIGS. 4B to 4E.

The step of determining the first active power Pinv and the first reactive power Qinv that must be supplied by the inverter 4 may be performed by a vector calculation using the matrix calculation or else by using complex or imaginary numbers, e.g. Sinv=Pinv+j Qinv. Depending on the calculation method used, it will be simpler to use the active power P and the reactive power Q or the apparent power S and the power factor PF.

Figure 5A:
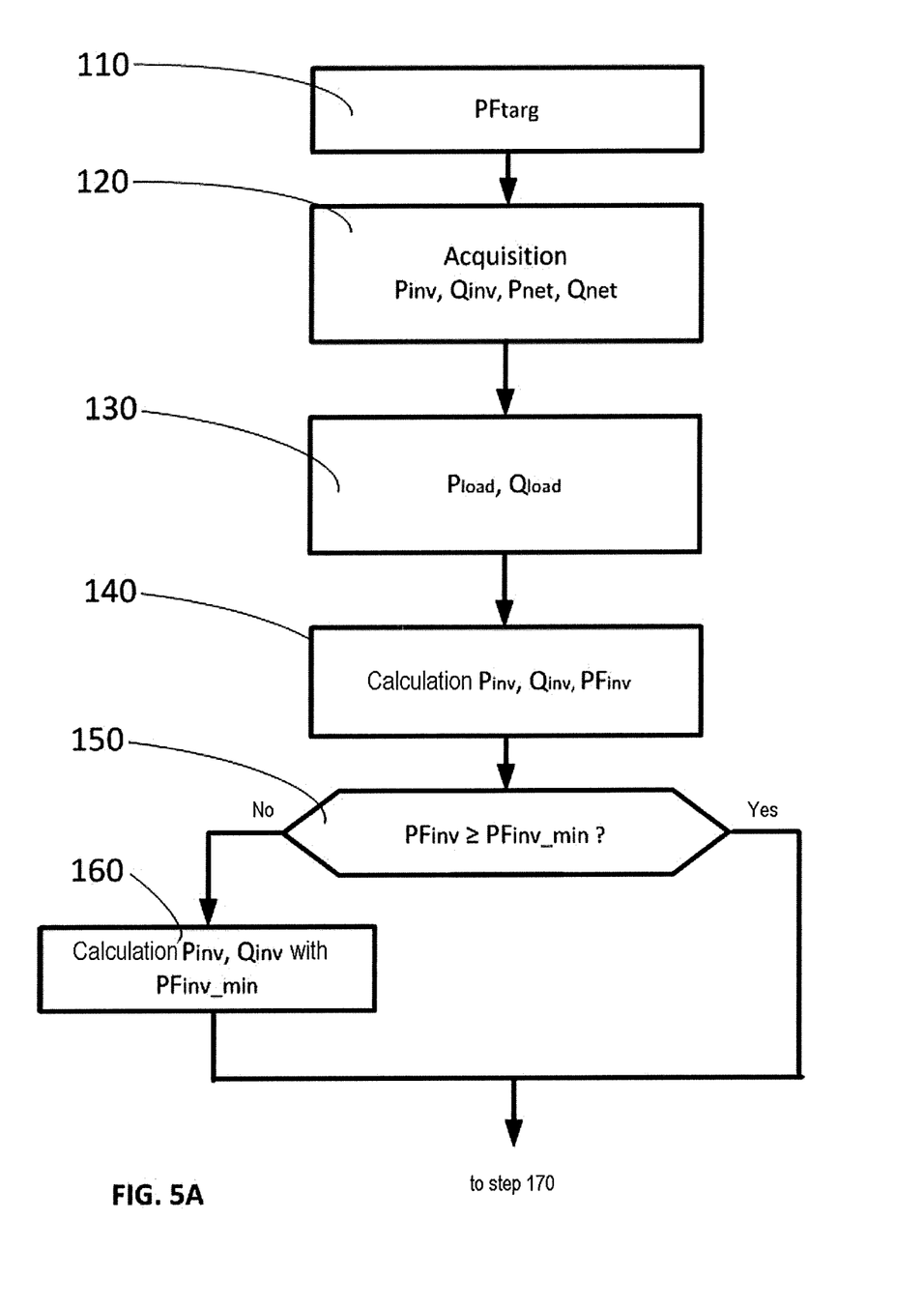
FIGS. 5A and 5B represent a flowchart of the method for optimizing the energy supply from a variable source according to the invention.
Figure 5B:
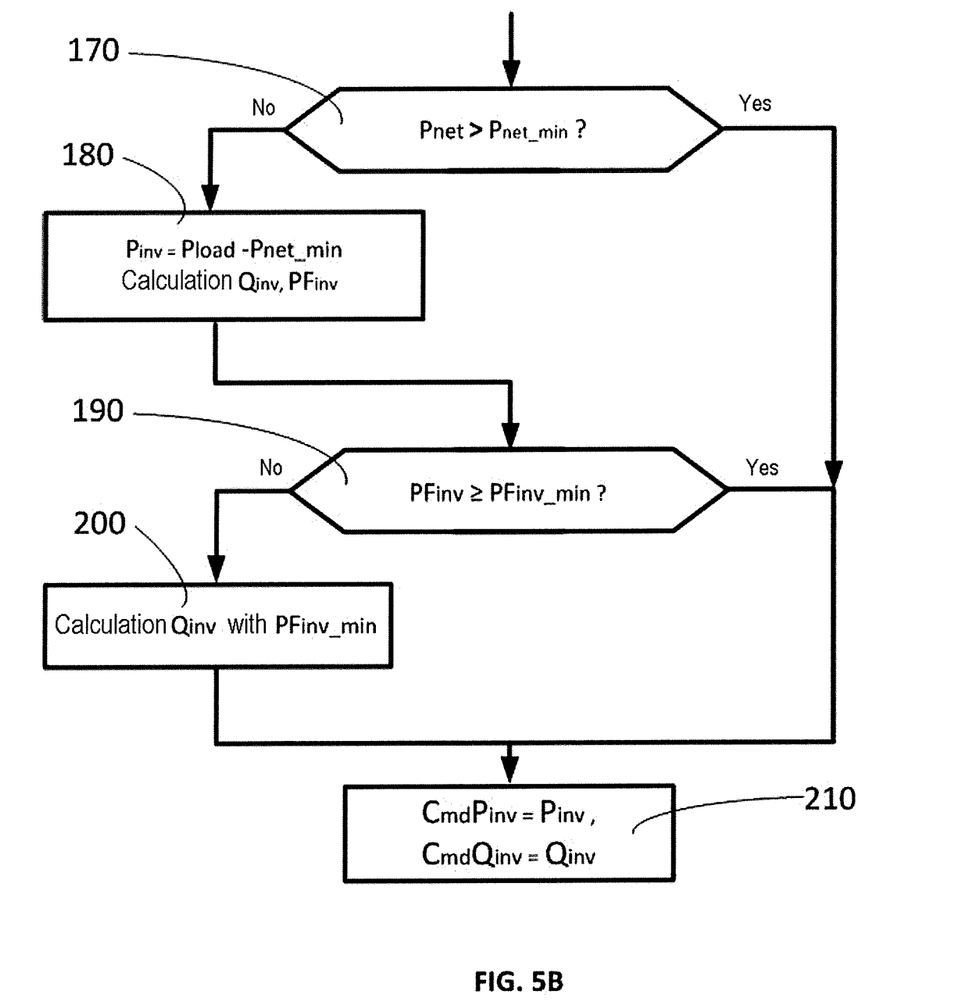

FIGS. 5A and 5B represent a flowchart of the method according to the invention.

The method begins with a step 110 of acquiring the value of the target power factor PFtarg. The value of said power factor may be stored in memory in the inverter control device 5 or entered via a man-to-machine interface. The method continues with a step 120 of acquiring the values of the first active power Pinv and the first reactive power Qinv by means of a measurement or by communication of the data between the inverter 4 and the inverter control device 5. A measurement of the third active power Pnet and the third reactive power Qnet is also performed during step 120. The method continues with an evaluation sequence 130 of the second active and reactive powers Pload and Qload consumed by the load 3. As a variant, when the load 3 is constant, the method may have predetermined values for the second active and reactive powers Pload and Qload stored in memory in the inverter control device 5 or entered via a man-to-machine interface. When the load 3 is variable, which is generally the case, and according to a first variant, the method calculates the second active power Pload by performing a sum of the third active power Pnet supplied by the distribution network 2 and the first active power Pinv supplied by the inverter 4, Pload=Pnet+Pinv, the values of Pnet and Pinv having been measured in the preceding step 120. A similar calculation is performed for calculating the second active power: Qload=Qnet+Qinv.

Figure 6:
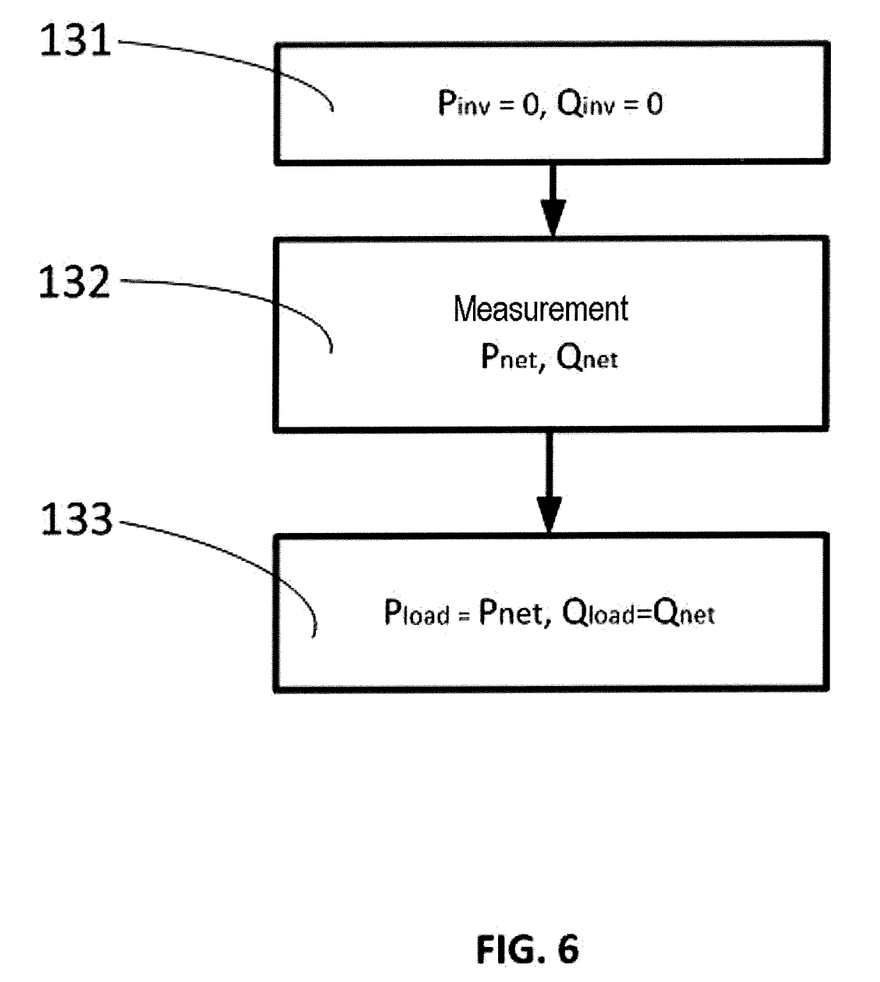
FIG. 6 represents a flowchart for determining the active and reactive powers consumed by the electrical load.

According to a second variant, represented in the form of a flowchart in FIG. 6, the second active power Pload and the second reactive power Qload consumed by the load 3 are evaluated during a sequence comprising:
- a step 131 of controlling the inverter 4 for supplying a zero first active power Pinv and a zero first reactive power Qinv,
- a step 132 of measuring the third active power Pnet and the third reactive power Qnet, and
- a step of determining 133 the second active power Pload and the second reactive power Qload, the second active power Pload being equal to the third active power Pnet and the second reactive power Qload being equal to the third reactive power Qnet.
- Pload=Pnet when Pinv=0, and
- Qload=Qnet when Qinv=0.

A first determination of the values of the first active power Pinv and the first reactive power Qinv needed for the network power factor PFnet to be greater than or equal to a target power factor PFtarg is performed during a step 140, e.g. by means of a vector calculation described in FIG. 4B. During a comparison step 150, when the inverter power factor PFinv is greater than the minimum power factor PFinv_min, i.e. the inverter power factor PFinv is located within the inverter power factor area Zinv, then the inverter may supply the first active power Pinv and the first reactive power Qinv determined at the first determining step 140 and the method continues with a step 170 of verifying the value of the active power Pnet supplied by the distribution network. If, at the comparison step 150, the inverter power factor PFinv is less than the minimum power factor PFinv_min then the inverter cannot supply the first active and reactive powers Pinv, Qinv determined by the method, and, in this case, the method continues with a step 160 during which the inverter supplies the largest possible first reactive power Qinv, as represented in FIG. 4C. The first active power Pinv and the first reactive power Qinv are calculated from the apparent power Sinv that may be supplied by the inverter with the minimum power factor PFinv_min e.g. according to the following equations:

[Equation 2]

$$Q_{inv} = S_{inv}\sqrt{1 - PF_{inv\_min}^2}$$ [Math 2]

[Equation 3]

$$P_{inv} = \overline{S_{inv}^2 - Q_{inv}^2}$$ [Math 3]

In this way, the inverter supplies the maximum energy by improving the network power factor PFnet as much as possible. The method continues to step 170 of verification.

The distribution network manager 2 may impose a supply of a minimum third active power Pnet_min as part of the operation of the electrical facility 1 in self-consumption mode. During step 170, the method verifies that the active power Pnet supplied by the distribution network is greater than or equal to the minimum third active power Pnet_min. If this is the case, the first active power Pinv and the first reactive power Qinv determined by the method may be supplied by the inverter and the method continues to a step 210 of controlling the converter 4. When the active power Pnet supplied by the distribution network is less than the minimum third active power Pnet_min, the method comprises a step 180 of calculating the first active power Pinv that must be supplied by the inverter 4 for the network to supply the minimum third active power Pnet_min. In this case, Pinv=Pload−Pnet_min. The first reactive power Qinv is maximized so that the third reactive power Qnet is minimal, as represented in FIG. 4D. A determination of the inverter power factor PFinv is also performed at step 180. A comparison of said inverter power factor PFinv with the minimum power factor PFinv_min is performed in a step 190. If the inverter power factor PFinv is greater than the minimum power factor PFinv_min, the values of the first active power Pinv and the first reactive power Qinv that must be supplied by the inverter having been determined are transmitted respectively in the form of control parameters CmdPinv and CmdQinv to the inverter 4 during step 210 of controlling the converter 4. If, during the comparison step 190, the inverter power factor PFinv is less than the minimum power factor PFinv_min, then the first reactive power Qinv is defined according to the first active power Pinv previously evaluated and the minimum inverter power factor PFinv_min as represented in FIG. 4E. The method continues with step 210 of controlling the inverter 4.

The method takes place cyclically with a period preferably between 1 minute and 10 minutes. The method may also take place on detecting a variation of the first active Pinv, reactive Qinv or apparent Sinv power, supplied by the inverter 4, or else on detecting any variation of the active Pload, reactive Qload or apparent Sload power consumed by the load 3.

The invention also relates to the control device 5 of the electrical energy inverter 4 in the electrical facility 1. The control device 5, represented in the form of a block diagram in FIG. 1, comprises:
- a first measurement circuit 51, connected by a sensor link 54 to a sensor, for measuring at the connection point 21 either the third active power Pnet and the third reactive power Qnet, or the third apparent power Snet and the network power factor PFnet at the connection point 21,
- a second measurement circuit 52, connected to the inverter 4 by a first inverter link 44, for supplying a measurement, either of the first active power Pinv and the first reactive power Qinv, or of the first apparent power Sinv and the inverter power factor PFinv supplied by the inverter 4, and a control circuit 53 connected:

to the first measurement circuit 51 for receiving either the measurement of the third active power Pnet and the measurement of the third reactive power Qnet, or the measurement of the third apparent power Snet and the measurement of the network power factor PFnet, to the second measurement circuit 52 for receiving the measurement, either of the first active power Pinv and the first reactive power Qinv, or of the first apparent power Sinv and the inverter power factor PFinv supplied by the inverter 4, and to the electrical energy inverter 4 by a second inverter link 43, for controlling either the first active power Pinv and the first reactive power Qinv that must be provided by said inverter 4, or the first apparent power Sinv and the inverter power factor PFinv.

The control circuit 53 comprises circuits for performing the method as described previously and for transmitting to the inverter 4 the control parameters CmdPinv and CmdQinv corresponding to the first active power Pinv and the first reactive power Qinv that the inverter 4 must supply.

Optionally, the control device 5 may be installed in the electrical energy inverter 4 in order to reduce the cost of said device.

The first measurement circuit 51 is arranged for performing at least two measurements, preferably the third active power Pnet and the third reactive power Qnet. Said first measurement circuit 51 may also measure the third apparent power Snet and the network power factor PFnet given that the third active power Pnet and the third reactive power Qnet may easily be calculated from the third apparent power Snet and the network power factor PFnet and vice versa. The same applies for the second measurement circuit 52. More generally, it is possible to reconstruct any measurement of active, reactive, apparent power or of the power factor knowing at least two of these four measurements.

The invention also relates to an electrical facility 1 connected to an electrical network 2 at a connection point 21, said electrical facility 1 comprising:

at least one variable electrical energy source 42, at least one electrical energy inverter 4 connected firstly to the connection point 21, and connected secondly to the variable electrical energy source 42 for converting the energy supplied by said energy source 42 into electrical energy available at the connection point 21, and at least one electrical load 3, connected to the connection point 21, and a control device 5 for controlling the electrical energy inverter 4 as previously described.

Preferably, the variable energy source 42 consists of at least one photovoltaic panel. It may also consist of at least one generator driven by a wind turbine or by tidal energy.

The inverter 4 may be formed from the parallel connection of multiple inverters, each inverter being connected to one or more variable energy sources. In this case, the measurement of the first active power Pinv and the first reactive power Qinv corresponds respectively to a measurement of the active power and the reactive power supplied by all the inverters and the control parameters CmdPinv and CmdQinv are applied in a distributed manner to all the inverters for all the inverters to supply the first active power Pinv and the first reactive power Qinv required.

The method and device for optimizing the energy supply from the variable electric energy source 42 in the electrical facility 1 are particularly advantageous for using in the context of electrical energy production in a self-consumption mode. Indeed, the device only requires knowledge of the value of the target power factor PFtarg and, optionally, the value of the minimum third active power Pnet_min, these two parameters being imposed by the manager of the electrical energy distribution network 2. The electrical facility 1 behaves as an adaptive device, capable of optimizing its energy production by offering a network power factor PFnet high enough not to generate any penalty.

The invention claimed is:

1. A method for optimizing the energy supply from a variable electrical energy source in an electrical facility connected to an electrical energy distribution network at a connection point, said electrical facility comprising:

at least one inverter, connected firstly to the variable electrical energy source and secondly to the connection point, said inverter being arranged for converting the energy delivered by the electrical energy source and supplying a first controllable active power and a first controllable reactive power at the connection point, and an electrical load, connected to the connection point, and consuming a second active power and a second reactive power, the electrical energy distribution network supplying the electrical facility, with a third active power and a third reactive power with a network power factor, said method comprising:

a step of determining the first active power and the first reactive power that must be supplied by the inverter according to the second active power and the second reactive power, in order that the network power factor is greater than or equal to a predetermined target power factor.

2. The method according to claim 1, wherein the first active power and the first reactive power are further determined for minimizing the third active power or maximizing the first active power.

3. The method according to claim 1, wherein the inverter supplies the first active power and the first reactive power with an inverter power factor greater or equal to a predefined minimum inverter power factor.

4. The method according to claim 3, wherein the inverter supplies a maximum first reactive power when the converter power factor is equal to the minimum converter power factor.

5. The method according to claim 3, wherein the electrical energy network supplies a minimum third active power to said electrical facility when the electrical facility is capable of supplying the electrical energy in a self-consumption mode.

6. The method according to claim 5, wherein:

the first active power supplied by the inverter is equal to the difference between the second active power consumed by the load and the minimum third active power supplied by the electrical energy distribution network, the inverter power factor is greater than or equal to the minimum power factor, and the third reactive power is minimized or the first reactive power is maximized.

7. The method according to claim 1, wherein the second active power and the second reactive power consumed by the load are evaluated during a sequence comprising:

a step of controlling the inverter for supplying a zero first active power and a zero first reactive power, a step of measuring the third active power and the third reactive power, and a step of determining the second active power and the second reactive power, the second active power being equal to the third active power and the second reactive power being equal to the third reactive power.

8. A control device for controlling an electrical energy inverter in an electrical facility connected to an electrical network at a connection point, said electrical facility comprising:

at least one electrical energy inverter connected firstly to the connection point, and connected secondly to at least one electrical energy source for converting the energy supplied by said energy source, said inverter supplying a first active power and a first reactive power with an inverter power factor, at least one electrical load, connected to the connection point, consuming a second active power and a second reactive power, wherein said control device comprises, a first measurement circuit for measuring either a third active power and a third reactive power or a third apparent power and a network power factor at the connection point, a second measurement circuit for measuring either the first active power and the first reactive power or a first apparent power and the inverter power factor, and a control circuit connected:

to the first measurement circuit for receiving a measurement of the third active power, the third reactive power, the third apparent power and the network power factor, to the second measurement circuit for receiving a measurement of the first active power, of the first reactive power, of the first apparent power and of the inverter power factor supplied by the inverter, and to the electrical energy inverter for controlling the first active power and the first reactive power that must be supplied by said inverter, said control circuit being arranged for carrying out the method previously described according to claim 1 and transmitting to the inverter an active power CmdPinv and reactive power CmdQinv supply instruction corresponding to the first active power and the first reactive power that must be supplied by said inverter.

9. An electrical facility connected to an electrical network at a connection point, said electrical facility comprising:

at least one variable electrical energy source, at least one electrical energy inverter connected firstly to the connection point, and connected secondly to the variable electrical energy source for converting the energy supplied by said energy source into electrical energy available at the connection point, and at least one electrical load, connected to the connection point, wherein said electrical facility, comprises a control device for controlling the electrical energy converter according to claim 8.

10. The electrical facility according to claim 9, wherein the variable electrical energy source consists of at least one photovoltaic panel.

* * * * *